F. E. JOHNSON.
WEANER.
APPLICATION FILED JULY 17, 1920.
1,384,721.
Patented July 12, 1921.
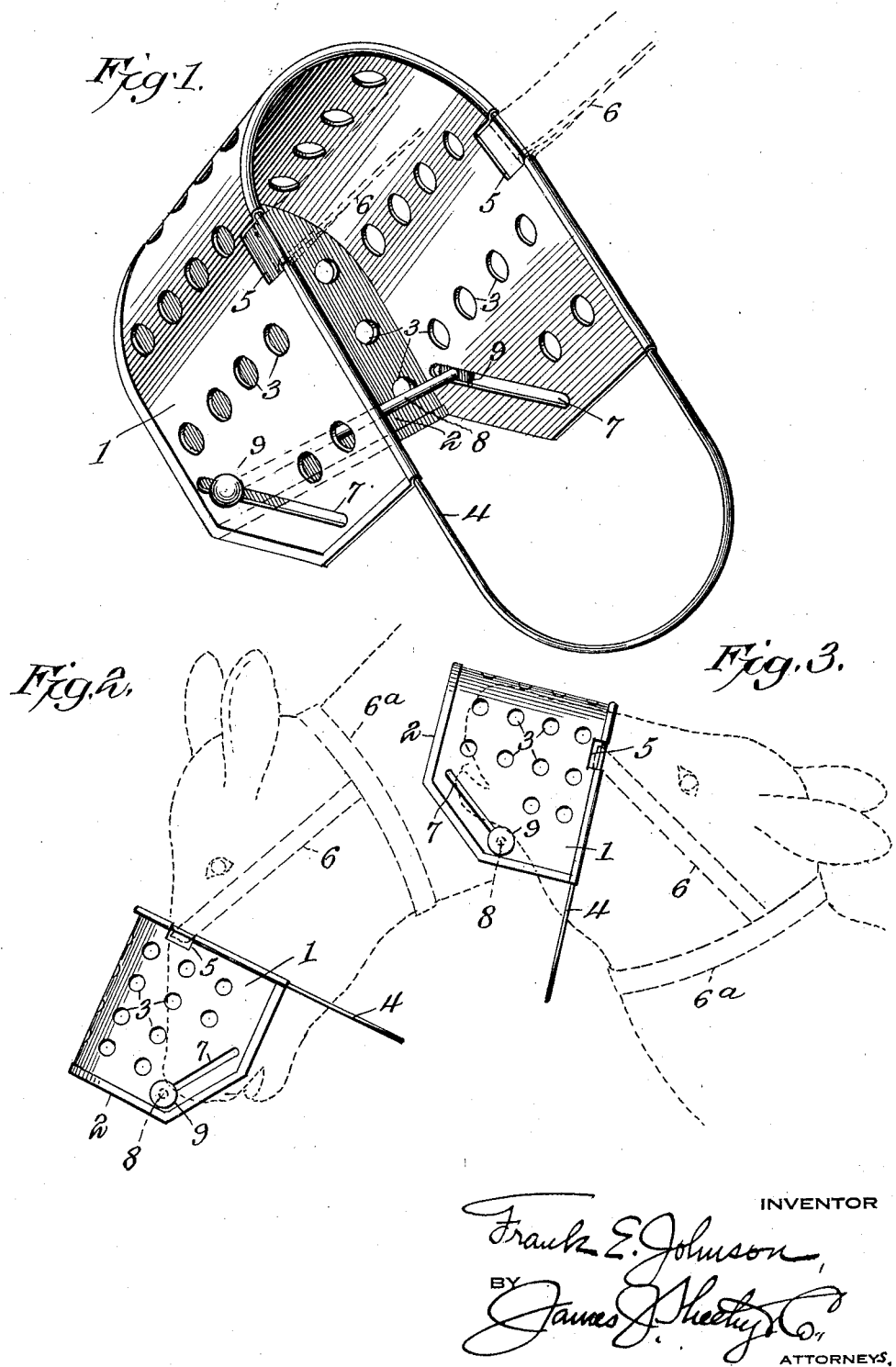
INVENTOR
Frank E. Johnson,
BY
ATTORNEYS.

UNITED STATES PATENT OFFICE.

FRANK E. JOHNSON, OF TRINIDAD, COLORADO.

WEANER.

1,384,721. Specification of Letters Patent. Patented July 12, 1921.

Application filed July 17, 1920. Serial No. 396,940.

*To all whom it may concern:*

Be it known that I, FRANK E. JOHNSON, a citizen of the United States, residing at Trinidad, in the county of Las Animas and State of Colorado, have invented new and useful Improvements in Weaners, of which the following is a specification.

My present invention pertains to calf and colt weaners and it contemplates the provision in a device for the purpose set forth of means whereby when the calf or other animal to which the weaner is attached raises its head to nurse, it will be prevented in its attempt by the automatic operation of the weaner roller that moves under the lower jaw of calf.

The invention further contemplates the provision of means whereby the calf or other animal may with perfect freedom eat grass or in fact anything that is resting on the ground, and this without the provision of an auxiliary or secondary cage that is swung with respect to the first cage as is the custom with weaners at present in the market.

The invention in all of its details will be fully understood from the following description and claims when the same are read in connection with the drawings, accompanying and forming part of this specification, in which:

Figure 1 is a perspective view looking into my novel calf weaner.

Fig. 2 is a side elevation illustrating the position of the automatically operated roller when the calf or other animal is grazing.

Fig. 3 is a side elevation illustrating the position of the roller when the calf attempts to nurse.

Similar numerals of reference designate corresponding parts in all of the views of the drawings.

The weaner comprises a muzzle section or side walls 1 and the bottom wall 2 that go to make up a cage that is secured to an animal through the medium of the straps 6 that enter and are secured to the securing openings 5. Provided in the body of the weaner are the air holes 3 to permit ready ventilation of the weaner, and at its upper end, when the weaner secured to the calf is in the position it assumes when the calf is grazing, I provide the bail 4 that extends completely around the weaner as illustrated in order to prevent crushing of the weaner.

Provided at the inner end of the straps 6 is a strap 6ª, which encircles the neck of the animal and this strap may be provided with any suitable fastening means in the discretion of those practising the invention.

I provide the slots 7 that are cut at an angle in walls 1, and in said slots I provide the roller 8, that has a studded end or head 9.

It will be manifest that the roller 8 will be retained in the slot 7 because of the heads 9 thereof, and it will also be apparent that when the animal raises its head to nurse, the roller 8 will automatically roll down the slot and under the lower jaw of the animal, and hence the jaws of said animal will be practically locked together. However, immediately on the lowering of its head, the roller will roll to the front of the slot and hence the animal will be as free to graze as would be the case were it not provided with a weaner.

It is readily seen that the device is simple and positive in action, and that through its use the calf or other animal is effectually prevented from not only nursing, but is as effectually prevented from rubbing the weaner off of its muzzle and hence defeating the purposes of my novel device.

Obviously the invention is very inexpensive to produce and contains no delicate or complicated elements that are liable to get out of order after a short period of use.

Having described my invention, what I claim and desire to secure by Letters-Patent, is:

1. In a weaner, the combination of a muzzle encircling portion open at its extreme lower end, a bail encircling the upper end, a set of slots provided at an angle in the side walls of the portion, and a roller adapted to be retained in the slot by head portions and automatically move forward and backward in the slots.

2. In a weaner, the combination of side walls and front walls formed in a single piece of material, a short bottom wall secured thereto, slots formed at an angle in the side walls, and a roller movable in the slots, said roller having heads at each end for preventing casual displacement of the roller from the slots.

3. In means for the purpose set forth, the combination of a body portion, a short bottom wall secured to the body portion, a bail encircling the body portion, openings arranged in the body portion, securing means arranged in the openings, and slots arranged at an angle in the rear of body portion and a roller adapted to move in the slots, said roller having headed ends to prevent casual displacement of the roller from the slot.

4. In a weaner, the combination of a muzzle portion, so constructed and arranged that the animal to which it is secured may graze when its head is lowered, and further constructed and arranged that the animal will be prevented from nursing when its head is raised; said construction comprising slots formed at an angle in the rear of the muzzle portion, and a roller having heads formed on its ends and adapted to move backwardly and forwardly in the slots.

In testimony whereof I have hereunto set my hand in presence of two subscribing witnesses.

FRANK E. JOHNSON.

Witnesses:
 MAX RASCOWER,
 A. RASCOWER.